US007747382B2

(12) United States Patent
Small et al.

(10) Patent No.: US 7,747,382 B2
(45) Date of Patent: Jun. 29, 2010

(54) METHODS AND SYSTEMS FOR REAL-TIME ENHANCED SITUATIONAL AWARENESS

(75) Inventors: Gregory J. Small, Federal Way, WA (US); Lee S. Hall, Seattle, WA (US); Rajit Jain, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 849 days.

(21) Appl. No.: 11/456,418

(22) Filed: Jul. 10, 2006

(65) Prior Publication Data

US 2008/0010004 A1 Jan. 10, 2008

(51) Int. Cl.
*G01C 5/00* (2006.01)
*G06F 19/00* (2006.01)

(52) U.S. Cl. ............................... 701/120; 701/3; 701/9; 701/10

(58) Field of Classification Search ..................... 701/3, 701/36, 120–122, 300, 301, 9, 10; 340/945–970; 244/75.1
See application file for complete search history.

(56) References Cited

U.S. PATENT DOCUMENTS

| | | | |
|---|---|---|---|
| 5,714,948 | A | 2/1998 | Farmakis et al. |
| 6,003,808 | A | 12/1999 | Nguyen et al. |
| 6,125,312 | A | 9/2000 | Nguyen et al. |
| 6,161,097 | A | 12/2000 | Glass et al. |
| 6,529,620 | B2 | 3/2003 | Thompson |
| 6,567,729 | B2 | 5/2003 | Betters et al. |
| 6,725,137 | B2 | 4/2004 | Eagleton et al. |
| 6,728,610 | B1 | 4/2004 | Marshall et al. |
| 6,738,748 | B2 | 5/2004 | Wetzer |
| 6,744,396 | B2 | 6/2004 | Stone et al. |
| 6,772,098 | B1 | 8/2004 | Stark et al. |
| 6,778,906 | B1 | 8/2004 | Hennings et al. |
| 6,816,762 | B2 | 11/2004 | Hensey et al. |
| 6,847,872 | B2 | 1/2005 | Bodin et al. |
| 6,885,921 | B1 | 4/2005 | Farmer |
| 6,901,318 | B1 | 5/2005 | Morronigiello et al. |
| 6,952,828 | B2 | 10/2005 | Greene |
| 6,965,816 | B2 | 11/2005 | Walker |

(Continued)

OTHER PUBLICATIONS

International Search Report, PCT US07/13330, dated Dec. 18, 2008, pp. 7.

(Continued)

*Primary Examiner*—Richard M. Camby
(74) *Attorney, Agent, or Firm*—Armstrong Teasdale LLP

(57) ABSTRACT

A system and method of automatically advising an individual, in real-time, of all available facts related to a current situation. The method is facilitated by a system, which automatically retrieves data related to a situation from a plurality of aviation enterprise systems, processes the data retrieved in real time and generates a situational awareness data that is presented in an optimal format to a user on an interface device. Processing of the data retrieved from the plurality of aviation enterprise systems comprises correlating the data in accordance with business rules and interpreting the data in view of previously stored historical information that relates to the situation. The situational awareness data generated is further processed in view of a user profile in order to create a viewable situational awareness data that has been optimized for presentation to an identified user of the system in accordance with the user profile.

30 Claims, 7 Drawing Sheets

U.S. PATENT DOCUMENTS

| | | | | |
|---|---|---|---|---|
| 7,006,903 | B2 | 2/2006 | Smith et al. | |
| 7,031,941 | B2 | 4/2006 | Garrow et al. | |
| 7,053,767 | B2 | 5/2006 | Petite et al. | |
| 7,068,301 | B2 | 6/2006 | Thompson | |
| 7,069,121 | B1 | 6/2006 | Cummings, Jr. et al. | |
| 7,069,261 | B2 | 6/2006 | Ahl et al. | |
| 7,098,810 | B2 * | 8/2006 | Bateman et al. | 340/963 |
| 7,131,136 | B2 | 10/2006 | Monroe | |
| 7,259,693 | B2 * | 8/2007 | Miller et al. | 340/945 |
| 7,333,887 | B2 | 2/2008 | Baiada et al. | |
| 2003/0191678 | A1 | 10/2003 | Shetty et al. | |
| 2004/0008253 | A1 * | 1/2004 | Monroe | 348/143 |
| 2005/0187677 | A1 | 8/2005 | Walker | |
| 2006/0095156 | A1 | 5/2006 | Baiada et al. | |
| 2006/0112139 | A1 | 5/2006 | Maple et al. | |
| 2008/0010005 | A1 | 1/2008 | Small et al. | |
| 2008/0010107 | A1 | 1/2008 | Small et al. | |
| 2008/0046167 | A1 | 2/2008 | Small et al. | |

OTHER PUBLICATIONS

Office Action dated Sep. 15, 2009 for U.S. Appl. No. 11/456,450; 43 pages.

International Search Report and Written Opinion for PCT/US07/13329; Dec. 18, 2008; 7 pages.

Written Opinion of PCT/US07/13334; Oct. 28, 2008; 6 pages.

* cited by examiner

METHODS AND SYSTEMS FOR REAL-TIME ENHANCED SITUATIONAL AWARENESS

BACKGROUND OF THE INVENTION

This invention relates generally to systems and methods for enhancing situational awareness where participating automated systems may be on board aircraft, on the ground, or both.

Such situation awareness communication is not limited to gathering and presenting data from a plurality of aircraft systems when the aircraft is in the air, but also includes gathering data when the aircraft is on the ground. Situation Awareness communication is generally bidirectional. As used herein, the term aircraft refers to airplanes, helicopters, missiles and any object capable of flight.

Situational awareness refers to the degree of accuracy by which one's perception of their current environment mirrors reality. It is the ability to identify, process, and comprehend the critical elements of information about what is happening in a person's respective environment with regards to a mission. More simply, it is knowing what is going on around you. Different groups of people and different people within a group need different information to be aware of different aspects of a situation. When an enterprise loses situational awareness, there is increased potential for human error and other mishaps.

Situation awareness has traditionally been confined to ground based systems with ground based presentation to ground based users. Increasingly sophisticated on board automated aircraft systems and aircraft communication systems provide the opportunity for the aircraft to be in communication in real time with business systems on the ground. For example, airline, airport station, maintenance operations, and business functions have traditionally been complex, and characterized by failures in situational awareness. In the future, these airline operations will be even more complex because more information will be available from the aircraft to make decisions. The challenge is interpreting and relating this data in order to enhance situational awareness. A desired state of situational awareness includes the gathering of data from many sources, filtering it according to the characteristics of the current situation and presenting the critical information to the right people, on and off the airplane, as it is occurring. Such a system will eliminate information overload and poor communications.

BRIEF DESCRIPTION OF THE INVENTION

According to aspects of various described embodiments the present invention is a system and method of advising an individual, in real-time, of all available facts related to a current situation. The method is facilitated by a system, which automatically retrieves data related to a situation from a plurality of enterprise systems, processes the data retrieved in real time and generates situational awareness data that is presented in an optimal format to a user on an interface device. Processing of the data retrieved from the plurality of aviation enterprise systems comprises correlating the data in accordance with business rules and interpreting the data in view of previously stored historical information that relates to the situation. The situational awareness data generated is further processed in view of a user profile in order to create viewable situational awareness data that has been optimized for presentation to an identified user of the system in accordance with the user profile.

The system that implements the method comprises a plurality of aviation enterprise systems, a decision support system, an integration system and an interface system. The integration system is networked to the interface system, the plurality of aviation enterprise systems and the decision support system. The integration system is operatively configured to correlate information retrieved from each of the plurality of aviation enterprise systems with the information received from the decision support system. In addition, the integration system is configured to process the information received from the decision support system, which includes business rules and historical data, and the information retrieved from the plurality of aviation enterprise systems and generate situational awareness data that is transmitted to the interface system where the situational awareness data is configured for display based on the profile of an identified user to which situational awareness data is to be displayed.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
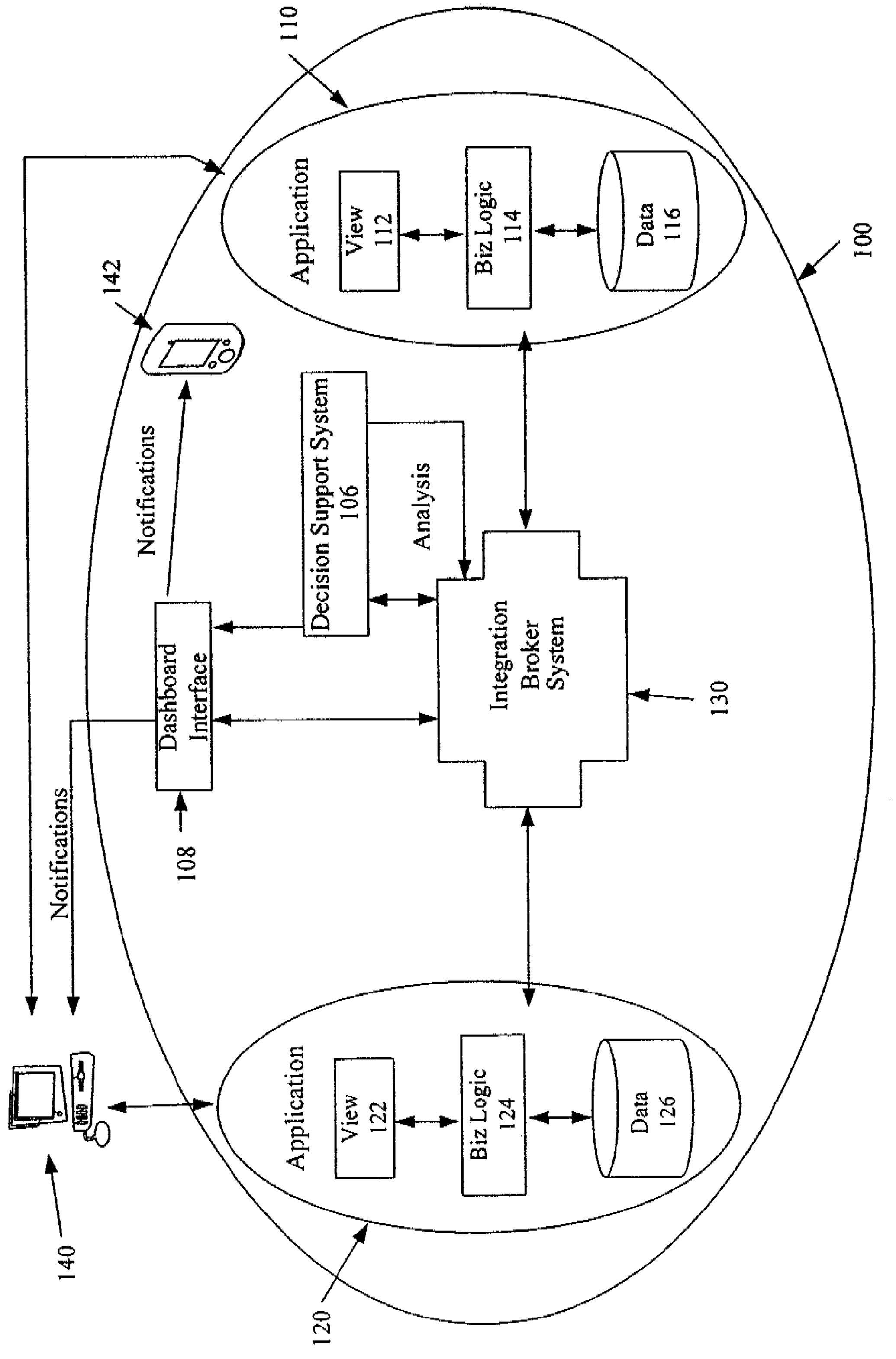
FIG. 1 is a diagram illustrating an exemplary situational awareness system, according to one embodiment.

Situational awareness can be defined as all the information necessary for a system operator to have an optimized understanding of the current operational environment that enables efficient decision-making. An operator of such a system is in a state of situational awareness when they have an accurate perception and understanding of the critical factors and conditions within a specific domain that can affect their successful operation of the system. In broad terms, situational awareness is a term used to describe a human operator's perception of reality. Based on the interpretation of available information the human will, at any given time, hold a set of beliefs about what is happening in the world around him and what action he should take. If a discrepancy exists between his beliefs and the reality of the situation (as might occur in conditions of high mental or physical workload, or as a result of the poor display of information), situational awareness becomes degraded, possibly leading to a chain of errors.

The present invention is described in the context of an airline operations environment. Notwithstanding, it is to be understood that situational awareness systems and methods apply to any environment whereby an operator or system user is required to interpret information from multiple systems in order to have an accurate perception and understanding of all the factors and conditions within a specific domain in which they are operating. Using the data available from various systems in an operational environment, a situational awareness tool will interpret the data and present it in a form that improves decision-making with respect to ground operations.

The methods and systems described herein include embodiments for the collection, analysis and presentation of information regarding status of multiple airplanes and airline operations to give an overall view of the health of an airline operation. Examples of such status information includes, but is not limited to, maintenance status, crew status, airport operation status, and flight revenue. In specific embodiments, views of the number of operations including one or more of flight operations, airplane turns, line maintenance, and others that are occurring as planned, those that are occurring within acceptable variance, and those which have exceeded planning ranges are provided. Additionally, such views also provide a trend line which allows a user to understand the relationship of the situation with the expected near term future based on the trend.

Various embodiments include views of one or more of current and near future resource utilization. These embodiments provide a relationship of a current airline operation situation against an airline operation plan and against a predefined utilization of airline resources, which are also sometimes referred to as assets. One specific example of an airline operation resource includes the employees of the airline and non-employees (contractors and other support personnel) that provide various services directed toward airline operation. Examples include, but are not limited to, airline crew (i.e., pilots and flight attendants, both active and reserve, mechanics, baggage handlers, gate agents, reservation agents, customer service agents, airline operations staff, maintenance operations staff, station operation staff (by station) Assets that are utilized in airline operation include, but are not limited to, airplanes, hanger bays, tools, ground equipment, and terminal gates at airports.

A resource utilization view embodiment consolidates information regarding the real time use of resources. The aviation industry is asset intensive, and knowing if all assets and resources are being used effectively can help manage better operations. In this resource utilization view, the provided information reveals to the user how assets are being used relative to the capacity for those assets. The system is configured to then assist the user in allocating those assets and resources across the enterprise. For example, if an airline has many maintenance or repair stations located across the world, it is valuable to know the capacity to accept unplanned maintenance at each of these maintenance/repair stations. Capacity for each station can be determined by a function of the tools, people, a qualification of the people, and time (assets) that are allocated for planned maintenance. A maintenance planner can then determine if that station has the capacity to accept more work or is likely to accept more work.

In one example scenario, it is determined that unscheduled maintenance is needed on an aircraft of the fleet. An operator, or user, of the system configured for resource utilization management operates the system to assess resource utilization at the possible repair stations, and then pick the repair station, capable of performing the unscheduled maintenance, that is least utilized. As a result, the impact to overall airline operations is minimized.

In various embodiments, capacity for other assets, including personnel assets such as flight crews, mechanics and ramp personnel can be determined. With this information, an airline can determine if they are under utilizing, over utilizing or optimally utilizing the resources with the perspective of a dynamic changing schedule.

Tracking assets in this fashion provides an airline with a global (e.g., world-wide) unified perspective on asset management, including, but not limited to, resource utilization (both people and hardware assets) and flight following. Flight following refers to a situation of knowing an aircraft's position in relation to flight schedules, airport schedules, repair station schedules and maintenance schedules, thereby reflecting potential impacts to assets and resources from an overall airline system perspective. The global perspective allows for a planner to implement, for example, buffer times between scheduled events such as: airline future planned schedules and actual schedule for the current day with reference to a future maintenance schedule plan and an actual maintenance schedule for the current day and with reference to a future planned schedule for a maintenance station and actual usage of the maintenance station for the current day.

In one specific embodiment, the global unified perspective view is a set of information that brings airline operational data together onto a single screen. For example, and in one embodiment, a world map serves as a backdrop on the screen, and a user is able to view resources, assets, and weather information and manipulate the above to smoothly solve, for example, a scheduled maintenance problem, with minimal or no disruption to the overall operation of the airline. Examples of the information that may be overlaid on such a display screen, or printout thereof, include, but is not limited to, flight following information, which is essentially information informing the user of aircraft location, which airport operations are a cause of concern for today, where can weather affect today's airline operations, what is a status of the airline supply chain, and what are the passenger (and/or cargo) loads around the world. Such information is useful when attempting to plan resource allocations.

Such a system view affords a user the ability to drill down so that information can be quickly assessed, such as alerts, allowing the user to focus on solving any problems at hand.

With a global unified view of information, operators will be able to at first glance gain a better understanding of global operations for which they are responsible. For example, in this embodiment, flight following information is correlated with one or more of flight schedules, airport schedules, maintenance schedules, and repair station schedules for each of the destinations for the aircraft. By combining, for example, the maintenance schedule information with fault messages received from the aircraft, maintenance planners are able to determine a likelihood for a specific aircraft to be serviced at one of its destinations. In this embodiment, a portion of the information available to the users is an integrated schedule of station operations, maintenance operations and flight operations. By combining this scheduled information with real time data, users can determine buffers between scheduled events and the feasibility of meeting aircraft maintenance schedules.

The situational awareness tool is configured, and has a technical effect such that it may gather and present data that is relevant to the decision maker's goals. The system has business rules that define a respective user's goals which gathers and presents data in such a manner that allows the user assess how they are performing against those goals. As part of the data gathering process, the situational awareness tool extracts critical data from networked systems and transmits the data to a medium where the user can begin interpreting such data. The situational awareness system includes data analysis and processing to provide an understanding as to the criticality of the information being captured and stored, based on business rules and a user profile, which controls the select data being captured, stored and presented to the user. The data analysis processing provides the understanding of the criticality of the information. For example, some information may not be relevant for present decisions, but may have significance relevance for future events. For example, a slightly elevated aircraft engine exhaust temperature may not affect any current operational decisions, but it may have an affect on maintenance scheduling. As another example, a flight that is fifteen minutes late arriving to a terminal may not affect aircraft operational decisions, but it may have an affect on fueling truck and other maintenance operations.

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected hardware and software modules within the computing system. The implementation is a matter of choice dependent on the requirements of the computing system implementing the embodiment. Accordingly, the logical operations making up the embodiments described herein are referred to alternatively as operations, steps or modules.

FIG. 1 illustrates an exemplary system 100 for automated collection, processing and presentation of situational awareness information concerning events and the general status of circumstances surrounding an aircraft according to one embodiment. In this embodiment, the system 100 includes a first aviation enterprise system 110, a second aviation enterprise system 120, a decision support system 106, integration broker system 130, dashboard interface system 108, user interface workstation 140 and a mobile user interface device 142. Aviation enterprise systems are individual systems that monitor, for instance, air traffic or maintenance plans, etc. The embodiment of system 100 illustrated in FIG. 1 shows only two aviation enterprise systems, a first aviation enterprise system 110 and a second aviation enterprise system 120. For purposes of this example, the first aviation enterprise system 110 is an air traffic enterprise system and the second aviation enterprise system 120 is a maintenance plan enterprise system.

While FIG. 1 shows only two aviation enterprise systems, it is to be understood that the embodiment illustrated in FIG. 1 may be configured to include more than two aviation enterprise systems, each of which is connected to the integration broker system 130. Each aviation enterprise system includes a processor, a viewing device, business logic, and data storage. As illustrated, first aviation enterprise system 110 includes a processing capability that results in, a view 112, business logic 114, and data storage 116. The second aviation enterprise system 120 also includes a processing capability that results in, a view 122, business logic 124, and data storage 126. In operation, the decision support system 106 is retrieving information related to situations of which various users need to be advised. In addition, the decision support system 106 may be triggered to gather additional information in response to an event.

Specifically, the decision support system 106 includes a set of data parameters that define data of which individuals need to be aware, and such data are continuously pulled from a respective aviation enterprise system. The data, which has been retrieved, is correlated in accordance with business rules. The business rules are associated with the data retrieved and based on rules defined by an entity controlling how data are interpreted. For example, the failure rate of an aircraft component and the speed with which it is repaired may differ between two airline companies based on the priority each airline places on replacement of the failed component. The priority and interpretation of an event or situation may vary from airline to airline based on business rules and the manner in which data are interpreted by the business rules.

The data is further processed in view of historical data that is retrieved by the decision support system 106, generating awareness of a situation. The decision support system 106 transmits the situational awareness data to the dashboard interface system 108 which further processes the situational awareness data in view of user profiles of the users networked to the system, presenting the situational awareness data in manner that is optimized in accordance with preferences to viewing the situational awareness data. Users of the system 100 may view the situational awareness data presented to the interface dashboard system 108 via a user interface workstation 140 or a mobile user interface device 142.

Figure 2:
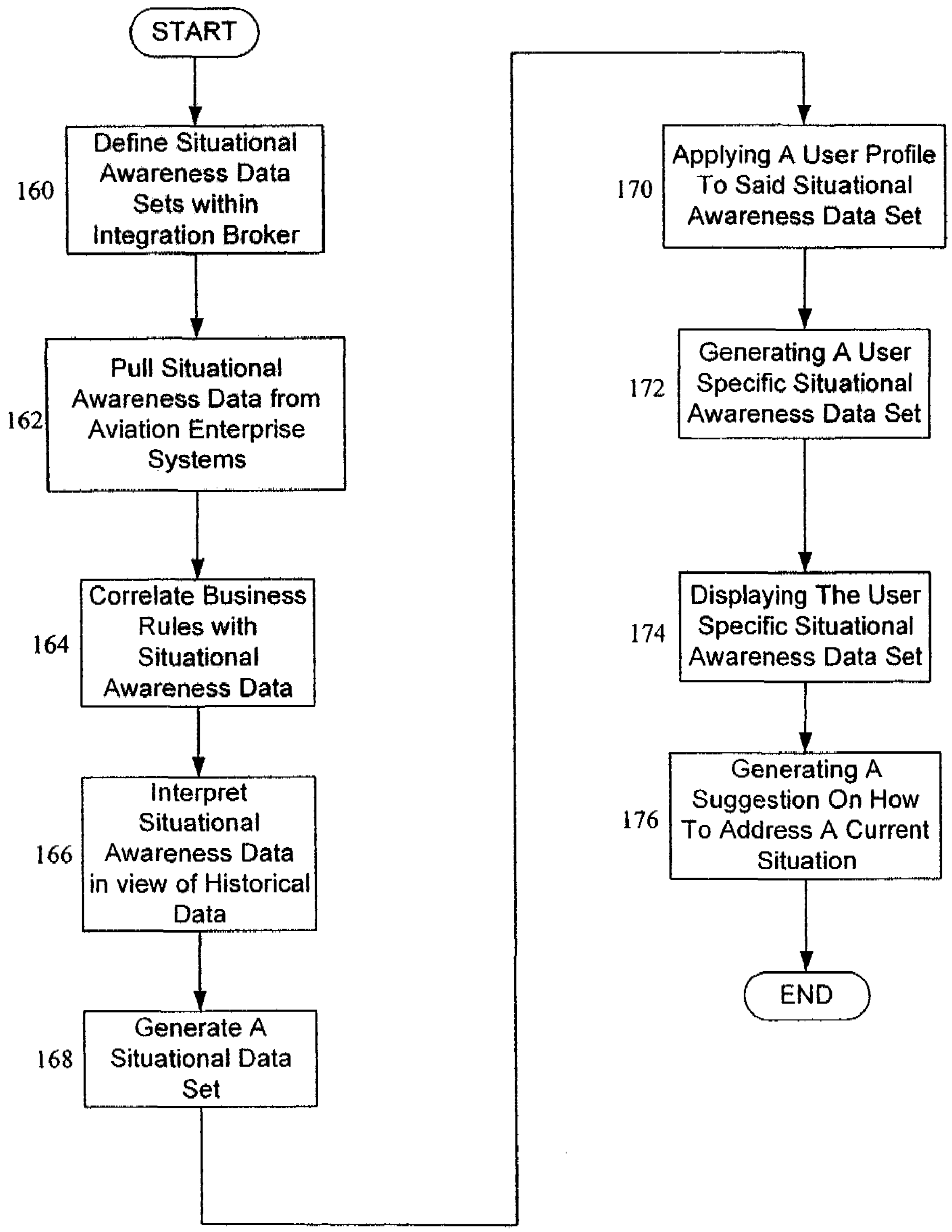
FIG. 2 is a flow diagram, illustrating one embodiment of a situational awareness process.

FIG. 2 illustrates the process of generating situational awareness data for eventual presentation to a system user. First, a definition of the situational data must be defined 160 and stored within the decision support system 106. The definition sets the rules for the type of data that is to be retrieved from each of the plurality of aviation enterprise systems. In accordance with the definition 160 of the situational awareness data, the decision support system 106 retrieves 162 data from each of the plurality of aviation enterprise systems 110 and 120 through the integration broker and stores the data. Next, the decision support system 106 retrieves business rules that are associated with the situational data that has been retrieved from the plurality of aviation enterprise systems and correlates 164 the situational data in accordance with the business rules. Next, the decision support system 106 interprets 166 the correlated 164 situational data in view of historical data. Next, the decision support system 106 generates 168 integrated situational awareness data that combines the information retrieved and transmits the situational awareness data to the dashboard interface system through the integration broker. The dashboard interface system includes user interface profiles that are applied 170 to the situational awareness data in order to generate 172 user specific situational awareness data. The dashboard interface system displays 174 the user specific situational awareness data to a respective user through user interface devices, including generating 176 one or suggestions on how to address current situations.

An aspect of the present invention is the ability to integrate information from a plurality of independent aviation enterprise systems and present the information to a system user in a manner dependent on who the user is and preferences previously defined for the user. For example, aircraft maintenance has a plurality of enterprise systems and flight operations each having its own information and related systems. While these sets of systems have related information, in the past the information was not joined together and presented to the user in a manageable arrangement. The user was required to review information from two systems and correlate the information on their own. If a maintenance operations schedule were integrated with a flight operations schedule, an overall awareness of availability of aircraft for scheduled maintenance, and availability of maintenance facilities and materiel for unscheduled aircraft maintenance needs would be achieved. In this example, the decision support system 106 integrates the scheduling portion of maintenance and flight schedules associated with specific airports at which a respective plane having a maintenance problem may be landing and present the results in real time. Other aviation enterprise systems that may be integrated with maintenance and flight scheduling systems may include, but are not limited to, maintenance crew scheduling system, weather systems, air traffic control systems, systems maintaining data related to aircraft structural repairs, and systems containing documents regarding an aircraft's air worthiness.

The situational awareness system of the present invention takes all of this data and merges it, thereby performing at least one object of the present invention, specifically, gathering and presenting data that was presented separately in the past. This invention presents the data in an integrated way, presenting different views of the data associated with a situation depending upon a respective user's profile. The present invention synthesizes the data by filtering the information and presenting the information that is the most important, or relevant, to an individual user. The information is presented in such a way that the data advises the respective user of a situation, thereby allowing the user to efficiently assess the situation and its potential impacts.

Figure 3:
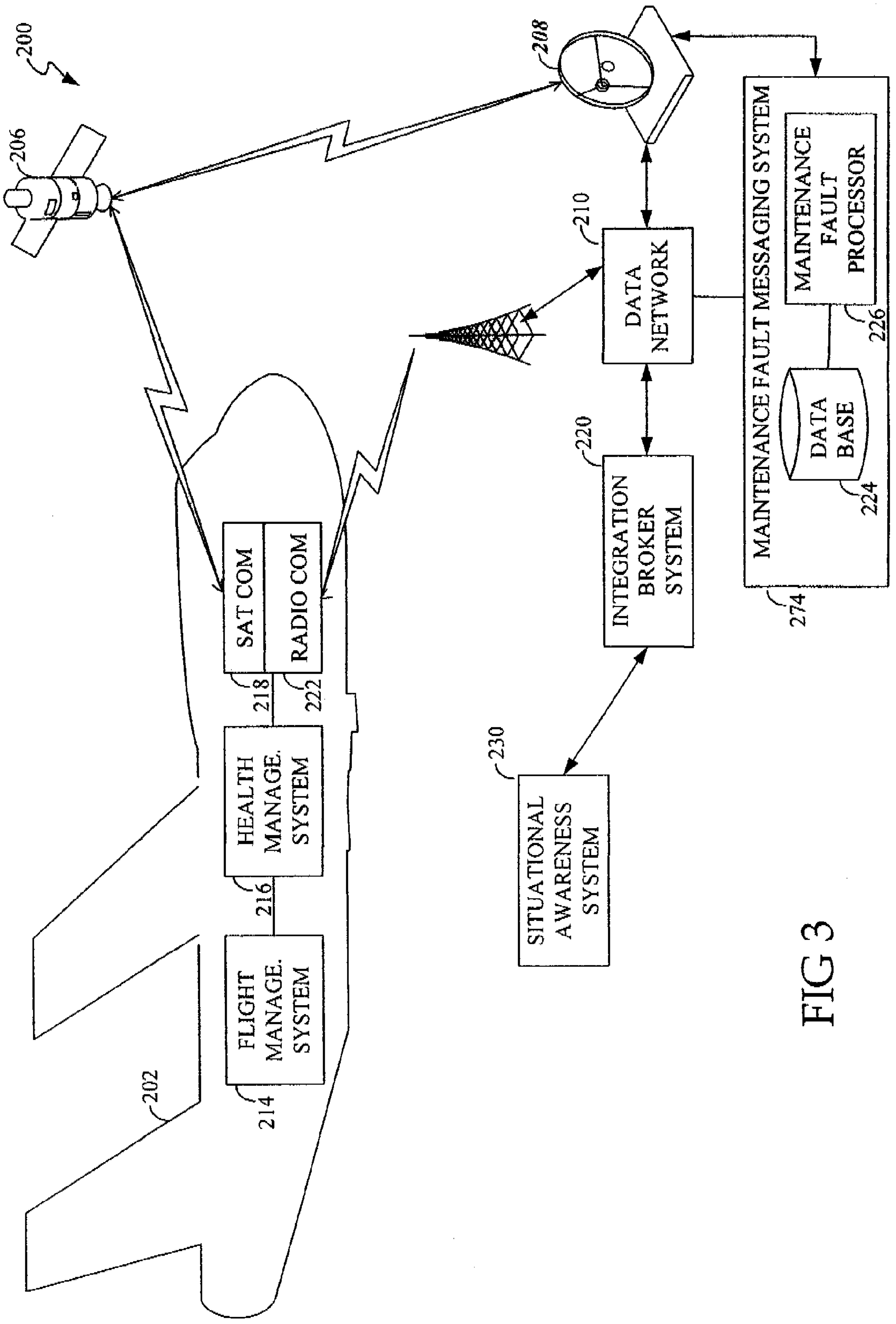
FIG. 3 is a diagram illustrating components of a situational awareness system utilized in aircraft flight and maintenance.

FIG. 3 illustrates an exemplary system 200 in which a situational awareness system is integrated with one aviation enterprise system 274 (maintenance fault messaging system) and an aircraft 202, which may be in flight. As illustrated, the system 200 is configured for automated collection and transmission of information concerning health of the aircraft from the aircraft 202, to situational awareness system 230. Data concerning aircraft health is transmitted from the aircraft 202 to the aviation enterprise system (maintenance fault messaging system) 274 that transmits the data to an integration broker 220 upon request of the data by the integration broker 220. While FIG. 3 illustrates the communication of the situational awareness system 230 and the integration broker 220 with only one aviation enterprise system 274 (maintenance fault messaging system), it is to be understood that situational awareness system 230 may be integrated with a plurality of other aviation enterprise systems. The aviation enterprise systems which are accessed, such as the maintenance fault messaging system 274, for transmission of data to the integration broker 220 depends on the rules with which the integration broker 220 are programmed.

As illustrated, system 200 includes an aircraft 202, an aviation enterprise system 274 (maintenance fault messaging system—a ground-based computer system maintained by an airline or a third party), an integration broker system 220, a situational awareness system 230, one or more satellites 206, one or more satellite communication receivers 208, a data network 210, and one or more radio communication system receivers 212 (note: the radio receivers can be those which communicate with the airplane while in flight or radios, such as 802.11 wireless, which communicate only on the ground). Further, in accordance with this embodiment, aircraft 202 includes a Flight Management System 214, aircraft health management system 216, a satellite communication unit 218 and a radio communication unit 222. Still further, in accordance with this embodiment, the aviation enterprise system 274 includes a maintenance data store 224 and a maintenance fault processor 226.

In this embodiment, Flight Management System 214 is coupled to a variety of aircraft sensors (not shown) that provide information related to the performance of the aircraft 202, and environmental conditions. For example, the sensors may provide information such as engine pressure, engine rotation speeds, global positioning system (GPS) location information, wind speed and direction, temperature, altitude and air pressure. In addition, Flight Management System 214 settings that affect the performance of the aircraft 202, including both flight settings (such as target speeds) and route settings (such as flying off-path to avoid weather), may form part of the collected information. Flight Management System 214 includes interfaces to receive the output signals from the sensors, including analog-to-digital converters for handling analog sensor signals. In addition to the Flight Management System 214 the aircraft also includes an Aircraft Health Management System 216 that is used to monitor the aircraft's condition. The Aircraft Health Management System 216 is coupled to a variety of aircraft sensors (not shown) that provide information related to the health of equipment on the aircraft such as the engines or a device such as the integration drive generator. The integration broker 220 retrieves data from the maintenance fault messaging system 274 through the data network 210. The integration broker 220 also retrieves data from and transmits data to the situational awareness system 230 in processing and generating user specific situational awareness data.

By way of example, if an aircraft's Integrated Drive Generator fails, the health management system 216 recognizes the event and transmits a message to the pilot and to the maintenance fault messaging system 274. The message may be transmitted via satellite communication unit 218 to a satellite 206, then to a satellite communication receiver 208. Next, the message is transmitted through the data network 210 to the maintenance fault messaging system 274. The message may also be transmitted via the aircraft's radio communication unit 222 to a radio communication system receiver through the data network 210 to the maintenance fault messaging system 274. The maintenance fault messaging system 274 receives and interprets the message and defines the situation. The situational awareness system 230 retrieves data regarding the fault message and the defined situation and processes the information by way of correlating the message and the defined situation with business rules associated with the defined problem and situation. The data regarding the fault message and the defined situation is further processed in view of historical data regarding previous situations of a similar type and fault messages of a similar nature in order to place the situation and the event that caused the situation into context. The situational awareness system also determines the documents necessary to support repair or replacement of an Integrated Drive Generator and facilitates the transmission of electronic copies of such documents to appropriate maintenance personnel or that hard copies of the required documents are retrieved and made available to the appropriate maintenance personnel.

One method in which the situational awareness system 230 responds to an event, such as the failure of an aircraft's Integrated Drive Generator is to gather information from the perspective of, there is a situation, and how should it be responded to. In answering the question, the situational awareness system 230 gathers information from a plurality of aviation enterprise systems. For example, if the plane is flying to Paris and the aircraft's Integrated Drive Generator fails, the situational awareness system will retrieve data from a plurality of aviation enterprise systems, including the maintenance fault messaging system 274 and answer the question of whether the maintenance station at the Paris Airport has the resources (equipment, personnel) to handle the failure of an aircraft's Integrated Drive Generator. Situational awareness will also automatically determine whether the aircraft can continue on its flight path in view of the aircraft's failed Integrated Drive Generator. The situational awareness system will also automatically assess whether the aircraft needs to be diverted to another airport for repair at a strategic location having the resources to handle the failure, or whether the aircraft has to be diverted and landed immediately due to the hazards created by the aircraft's failed Integrated Drive Generator. The situational awareness system also determines, whether the airport to which the aircraft may be diverted has the skills, resources, people, parts and anything else that is necessary to fix the failed Integrated Drive Generator.

The situational awareness system can make these determinations based on information retrieved from the plurality of aviation enterprise systems to which it is networked. An important aviation enterprise system from which the situational awareness system must retrieve data in order to create optimal situational awareness is the system that includes the (extended twin-engine operations) ETOPS restrictions. ETOPS restrictions are procedures and regulations that govern how to deal with the failure of equipment on an aircraft. Some equipment failures are critical, requiring an immediate diversion and landing of an aircraft, and others are not critical. Within these non-critical equipment failures, some may require that restrictions be placed on aircraft usage (limits placed on distance aircraft may fly, limit aircraft to flights over land, etc.) and allow the repair of the equipment to be deferred. The situational awareness system retrieves data from the aviation enterprise system that includes ETOPS restrictions and correlates the data concerning the failure of such aircraft equipment regarding the failure of aircraft equipment with the regulatory data retrieved from the aviation enterprise system that includes ETOPS restrictions and correlates the data and presents the information to the user and advises on a course of action. A system user has the option of accepting proposed suggestion(s). If the suggestion relates to a failed part such as the Integrated Drive Generator, the user may be provided an option to defer fixing the failed part, or advising the user that the part requires immediate repair.

Figure 4:
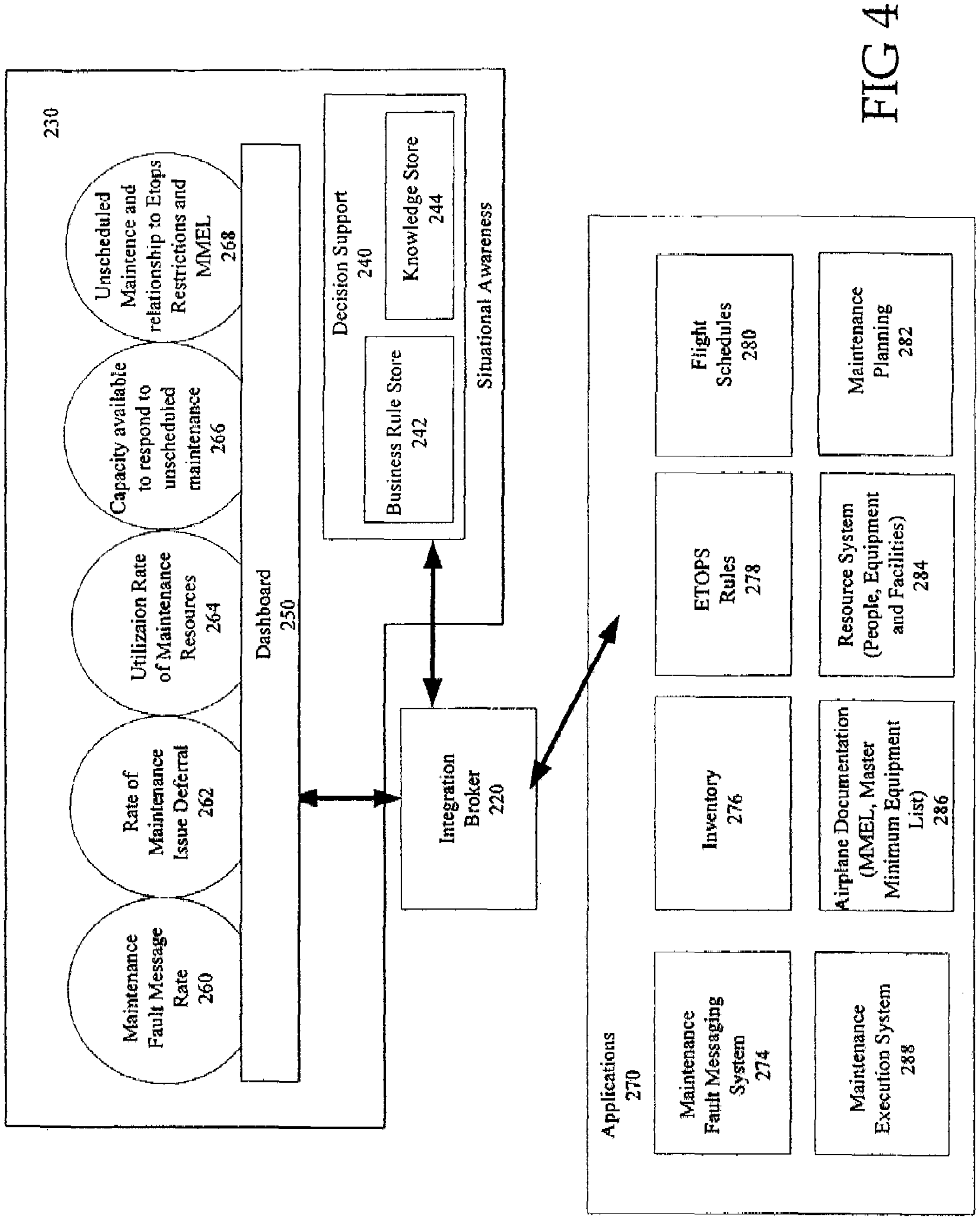
FIG. 4 is a diagram illustrating an exemplary situational awareness system.

FIG. 4 illustrates an exemplary system 400 for automated collection, processing and presentation of situational awareness information concerning events and the general status of circumstances surrounding an aircraft and supporting agencies and facilities according to one embodiment. In the embodiment illustrated, the system 400 includes a plurality of aviation enterprise systems 270, including but not limited to a Maintenance Fault Messaging System 274, an Inventory System 276, an aviation enterprise system 278 that includes the ETOPS restrictions, a Flight Schedules system 280, a Maintenance Planning system 282, an aviation enterprise system 284 that manages resources (people, tools, equipment, and facilities including schedules and operating limits), an aviation enterprise system 286 that includes the Aircraft Documentation and a Master Minimum Equipment List (MMEL) and a Maintenance Execution system 288 where maintenance records are stored and which houses information concerning maintenance tasks which have been deferred and logged within a maintenance queue.

Maintenance Planning system 282 hosts airplane maintenance schedules which are based, at least in part on manufacturers recommendations. Flight Scheduling system 280 is used and to store the flight schedules for aircraft within a fleet. Not shown is a Maintenance Documentation system that includes maintenance documentation that provides limits in which an airplane can operate. The Maintenance Fault Messaging system 274 receives maintenance faults that are transmitted from the systems onboard the aircraft down to the ground. A system that is capable of storing these maintenance faults is referred to as a filing a cabinet or as a computing system. Additionally, a Vehicle Health management system (not shown) is configured to monitor aircraft systems and produce status messages that can be consumed by Maintenance Fault Messaging system 274 and other on board applications.

System 400 further includes a decision support system 240, an integration broker system 220 and a dashboard interface system 250. The decision support system 240 includes a business rules store module 242 and a knowledge store module 244. The user interface workstation (not shown) and the mobile user interface device (not shown) are networked to the dashboard interface system 250. Integration broker system 220, in one embodiment, is configured to provide a conduit through which situational awareness requests/retrievals are passed.

Referring back to the example of the failure of an aircraft's Integrated Drive Generator, the situational awareness system 230 receives data from a plurality of aviation enterprise systems 270, including the maintenance fault messaging system 274. The integration broker system 220 retrieves data from the maintenance fault messaging system 274 regarding the aircraft's failed Integrated Drive Generator and also retrieves data from other aviation enterprise systems 270. The integration broker 220 retrieves data from the Inventory System 276 to determine if there are replacement parts or a replacement Integrated Drive Generator available for use in repair of the failed Integrated Drive Generator at the appropriate landing site. The appropriate landing sight is influenced by the data the integration broker 220 retrieves from the aviation enterprise system 278 that includes the ETOPS restrictions, which include FAA restrictions, rules and regulations on planes with failed components.

To the extent the equipment failures are defined as critical, requiring an immediate diversion of the flight plan and landing of the aircraft, the pilot as well as all other necessary personnel on the network shall be advised of the recommendation to land the aircraft along with any other pertinent situational awareness data. If the equipment failure is defined as a non-critical failure, some restrictions may be placed on aircraft usage, such as a limit on the distance the aircraft may fly. If the failure does not require immediate landing, there may be a landing sight more suitable to repairing the failed equipment, specifically, a sight that is within the allowed flight distance for an aircraft which such an equipment failure, and that has the appropriate repair parts for the failed equipment or a replacement for the failed equipment. The appropriate landing sight may also be the flight destination, because it is within the allowed flight distance, regardless of whether it has the replacement parts or a replacement for the failed equipment, for example, the above described integrated drive generator.

The integration broker 220 also retrieves data from the Flight Schedules system 280. If the failed Integrated Drive Generator is deemed not critical and the aircraft may continue to fly and does not require immediate diversion, then the flight schedule data at each potential landing sight may be assessed to determine if the plane may be diverted to another airport. The integration broker would also be assessing the flight schedules of all aircraft at the possible flight destinations for a plane swap, so that the plane may be fixed immediately. Whether the plane may be fixed immediately or at some point in the future is dependent upon the possibility of whether the repair of the equipment may be deferred and the maintenance planning data, resource data concerning availability of maintenance personnel, equipment data and facilities data retrieved from the maintenance planning system 282, the maintenance execution system 288 and the resource system 284. It is possible that the proposed repair does not fit into the repair schedule based on the maintenance plan. If that is the case, and the failure is not critical, the flight may be allowed to proceed as planned.

The integration broker 220 retrieves and processes data related to the defined situation. Within processing of the data, the integration broker 220 correlates the message and the defined situation with business rules retrieved from the business rules store 242 within the decision support system 242. The correlated data is further processed in view of historical data retrieved from a knowledge store 244 within decision support system 240. The situational awareness system also determines the documents necessary to support repair or replacement of an Integrated Drive Generator. The integration broker 220 retrieves data from the aviation enterprise system 286 that includes Airplane Documentation, including the Master Minimum Equipment List (MMEL). The situational awareness system also facilitates the transmission of electronic copies of such documents to appropriate maintenance personnel or that hard copies of the required documents are retrieved and made available to the appropriate maintenance personnel. The integration broker 220 also retrieves data from the knowledge store 244, which includes historical data on events such as a failed Integrated Drive Generator. The historical data includes data concerning the time it took to repair an Integrated Drive Generator in the past. This data allows the integration broker 220 to further assess and determine the possible locations at which a failed part, such as the Integrated Drive Generator, may be fixed.

Within the situational awareness system 230, the dashboard interface 250 facilitates the presentation of data to respective system users. The dashboard interface includes a processor that filters data within the situational awareness data based on the profile of a user networked to the system. A system user has a profile stored on the dashboard interface system 250 that controls filtering of situational awareness data that a system user is to be presented. The profile of a respective user determines the data presented to the user concerning situational awareness. In the embodiment illustrated in FIG. 4, the dashboard illustrates five views concerning the failure of the Integrated Drive Generator. In the first view 260, the dashboard interface system illustrates data representative of the maintenance fault message rate. In the second view 262, the dashboard interface system illustrates data representative of the rate of maintenance issue deferral. In the third view 264, the dashboard interface system illustrates data representative of the utilization rate of maintenance resources 264. In the fourth view 266, the dashboard interface system illustrates data representative of the capacity available to respond to unscheduled maintenance. In the fifth view 268, the dashboard interface system illustrates data representative of the unscheduled maintenance and relationship to ETOPS restrictions and MMEL.

Figure 5:
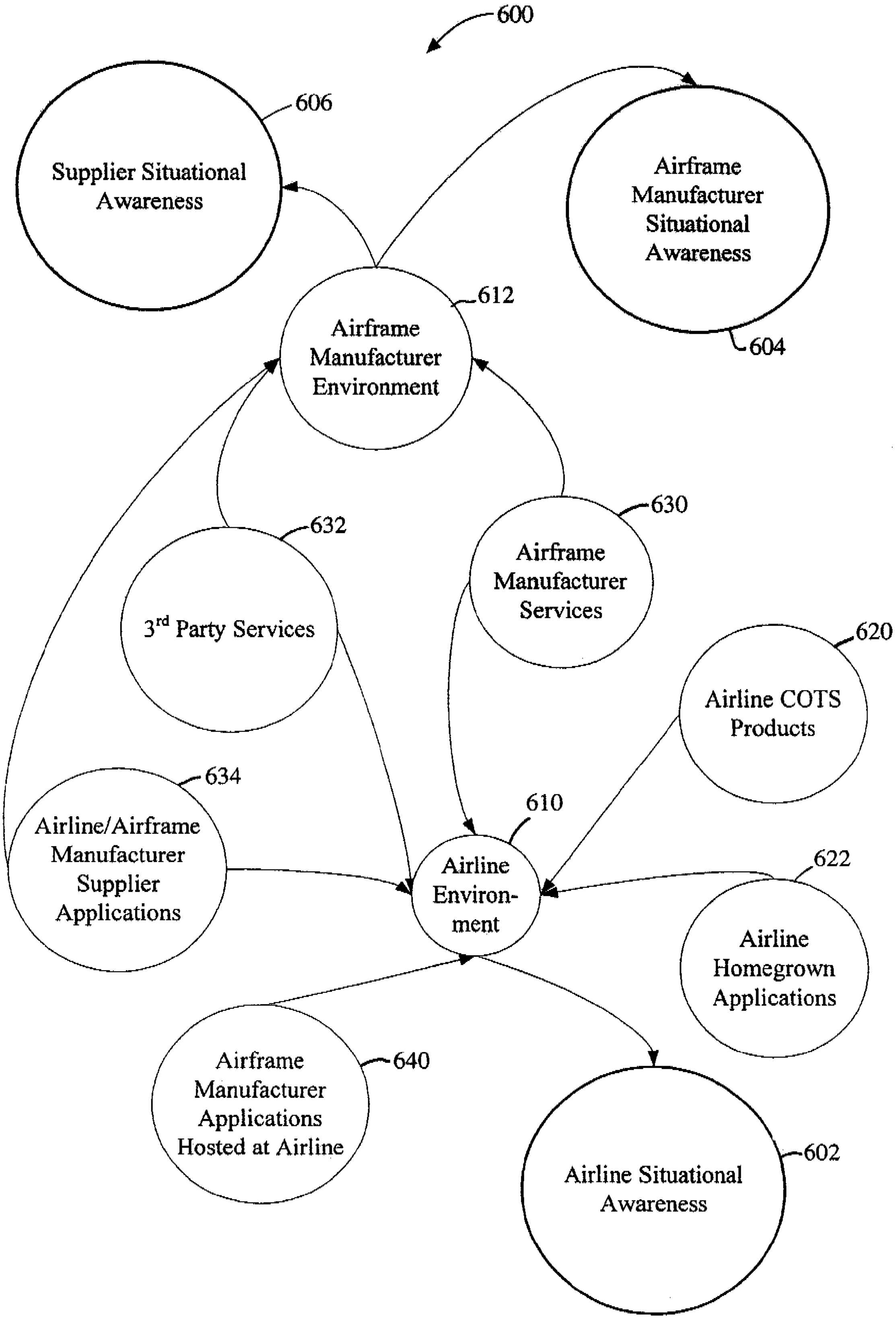
FIG. 5 is a diagram illustrating contexts of a specific situational awareness enterprise.

FIG. 5 is a diagram 600 that illustrates situational awareness in the context of an airline operator 602, an airframe manufacturer 604, and a parts supplier 606 as related to an airline environment 610 and an airframe manufacturer environment 612. Providing input into the airline environment are airline specific applications including airline commercial-off-the-shelf (COTS) products 620 and airline produced (e.g., homegrown) application 622. Applications provided by the airframe manufacturer (e.g., airframe manufacturer services 630) provide input into both environments 610 and 612 as do third party services 632 and joint applications 634. A manufacturer application 640 may be provided by an airframe manufacturer to provide input into only the airline environment 610.

Figure 6:
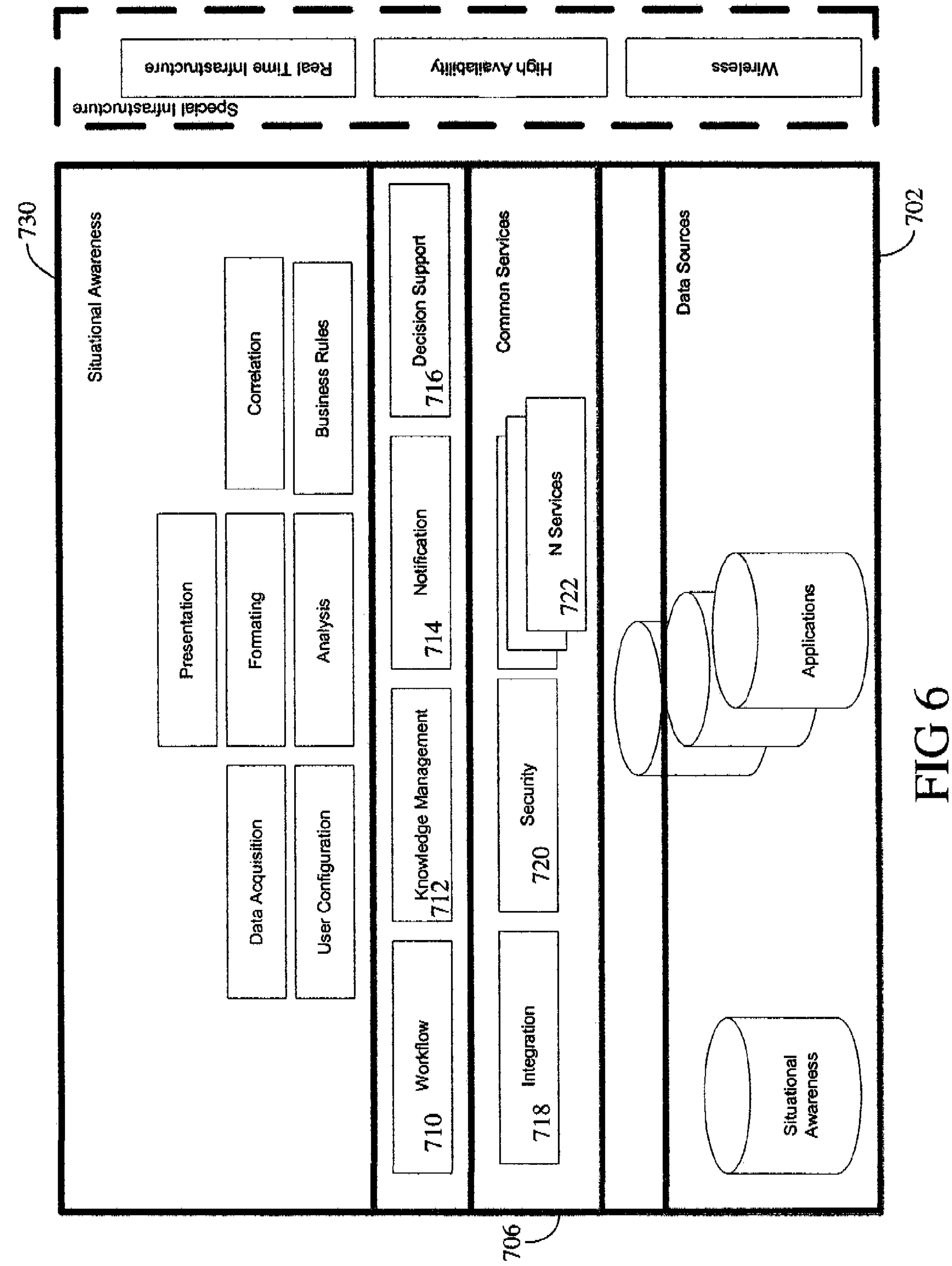
FIG. 6 is a block diagram illustrating a hierarchy of data that is maintained within one embodiment of a situational awareness tool.

The Situational Awareness tools and methods for operating the tool described herein provide standards and instrumentation necessary, for example, to run an airline. FIG. 6 is a block diagram 700 illustrating a hierarchy of data that is maintained within one embodiment of a situational awareness tool. Specifically, data sources 702 include data from a plurality of applications 704, at least some of which have been generally described above with respect to FIG. 5. Common services 706 that are utilized in providing users with information that allows for informed decision making include, but are not limited to, workflow management 710, knowledge management 712, notifications 714, decision support 716, integration 718, security 720, and other services 722. In providing the user a presentation of situational awareness 730, applicable tools may include presentation 732, data acquisition 734, formatting 736, correlation 738, user configuration 740, analysis, 742, and business rules 744.

The above described situational awareness tools have the technical effect of helping users in defining the instrumentation, understanding the inputs, and interpreting and processing the inputs for the instrumentation that presents situational awareness information to groups of users. The tools are developed, for example, with business rules in mind. The instrumentation in the situational awareness tools is dynamic such that there is more than an indication that something is wrong. Rather, the situational awareness tools and systems (for example system 100 of FIG. 1) are able to indicate that the operation, for example, the running of an airline, is moving in the wrong or right direction, at what speed is it moving in that direction. More specifically and continuing with the airline operation example, operators need to know when they are slowly deviating from the plan and how fast they are moving in this direction, with respect to aircraft scheduling and availability, maintenance, airport backlog, personnel, etc.

Figure 7:
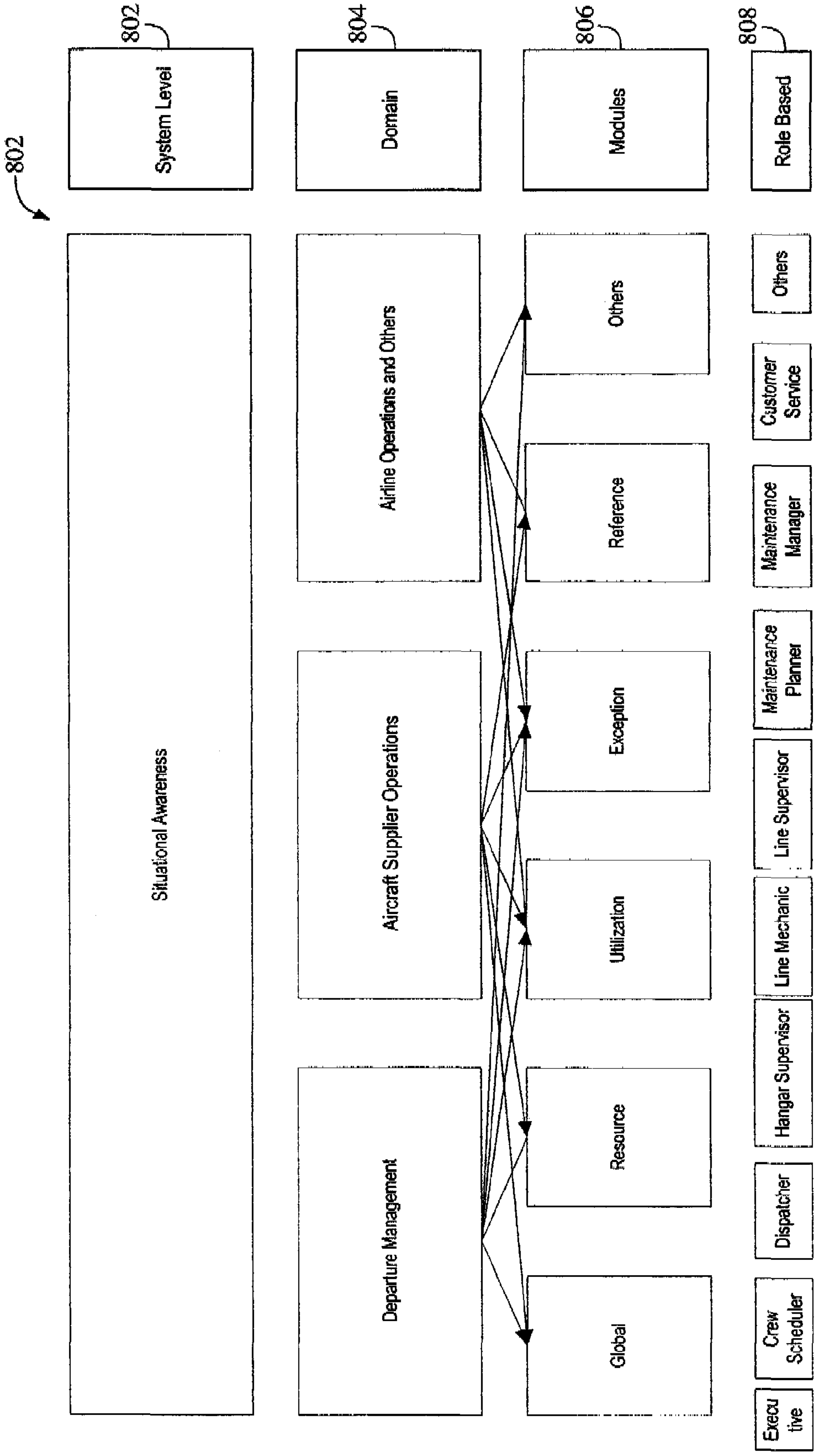
FIG. 7 is a role based architecture for one embodiment of the situational awareness system.

The backbone to the instrumentation of the situational awareness system of FIG. 7 are the algorithms processing the data from the various contributing enterprise systems, examples of which are described specifically with respect to FIG. 4 and generally with respect to FIG. 6. As the situational awareness system evolves, algorithms will assess the current situation and transform the data for the user to easily interpret. One category of algorithm process real time information to give the user the best understanding of his current environment. Another category of algorithms advise the user of the various options that meet business rule criteria.

As the real time information is processed, users are provided with a real time perspective of the operations according to their function. Algorithms running in the background filter out the superfluous data that typically confuse an operator and presents the information in formats that user can digest. This means that goals such as enabling easier decision making by packaging options together for the user, enabling users to efficiently assess operational realities to empower fact driven decisions by tailoring specific role based rules, providing a consistent shared view across all users into the operational situation, and being an entry point into a suite of E-enabling products is met.

Additionally the situational awareness tool, and the methods associated therewith, allow business objectives to be met including differentiation of the integrated solution from competitors solutions, improvement of the e-Enable environment user experience, customer driven requirements, technical objectives, delivering situational awareness to devices with access to a network, and leveraging the e-Enabled reference architecture approach in the design and implementation further providing a scaleable solution that allows the addition of different modules.

One of the services listed with respect to FIG. 7 includes notification services 714 which is a service which will notify the user of situational awareness system alerts. Examples for the use of notification services 714 may include that a business rule has been violated or that a business rule has been met and communication is needed. Notification services 714 further provide a capability of emailing one or more users, providing SMS/MMS messages to a user's cell phone/mobile device, delivery of messages to applications for processing, and a setting of the priority of the message.

Notification services 714 also provides the capability to route and deliver messages to the right users. Applications are executed based on business rules. If the business rule (outside the application) requires notification the workflow system will construct a message and send to the integration broker to be routed to the appropriate users.

With respect to workflow services 710, the defining of business process rules for the situational awareness is critical for many of the various components of the situational awareness system. Once these business process rules are defined, the other components will be dependent on the workflow system. In the integrated environment of the situational awareness system, having different terminology from different application for executing the same process likely results in customer confusion and redundancy.

FIG. 8 is a role based architecture 800 for one embodiment of the situational awareness system described herein. The architecture 800 includes a system level 802, a domain level 804, a module level 806 and a role based level 808. The role based level 808 includes the users that might interact with a situational awareness system, including for the airline example used herein, but not limited to, an airline executive, a crew scheduler, a dispatcher, a hangar supervisor, a line mechanic, a line supervisor, a maintenance planner, a maintenance manager, customer service, and others. Modules 806 that these users may interface to include a global operations module, a resource module, a resource utilization module, an exception module, a reference module, and other modules depending on the application of the situational awareness system. Domains 804 within the situational awareness system include, for the example airline application, departure management, aircraft supplier operations, and airline operations.

Methods and systems to correlate airline maintenance operations data are described above. Specifically, the systems are implemented such that methods for correlating current data from airline systems and measuring that data against business rules inputted manually by a user or extracted automatically from aircraft technical documents are provided. Users of such a system address daily situations which they must handle to reduce disruptions in airline maintenance operations. Through utilization of the described methods and systems, users have an improved ability to respond to unscheduled maintenance by having information delivered relevant to solve the problem. As current data is captured into the system, for example, current airline issues, this data is compared against the enterprise knowledge store which is described above.

User interactions with the situational awareness system are accomplished through one or more software applications that are delivered, for example, over an airline's computer network or through the internet. In any event, user interaction provides an ability to access the situational awareness from any device with access to the airlines network or the internet, and results in better decision making capabilities, reduced learning curves, system wide awareness, and commonality between applications.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While the invention has been described in terms of various specific embodiments, those skilled in the art will recognize that the invention can be practiced with modification within the spirit and scope of the claims.

What is claimed is:

1. A method of advising an individual of available facts related to a current situation, said method comprising:

accessing data related to the current situation received from a plurality of enterprise systems in real time, a first portion of the enterprise systems on board aircraft, and a second portion of the enterprise systems being ground based;

correlating the data in accordance with one or more business rules;

interpreting the correlated data in view of historical data and thereby generating a situational awareness data set;

processing the situational awareness data set in view of a profile in order to create a viewable situational awareness data set that has been optimized in view of the profile; and presenting the viewable situational awareness data set to the individual.

2. The method of claim 1 further comprising receiving data from the enterprise systems on a continuous basis.

3. The method of claim 2 wherein receiving data from the enterprise systems on a continuous basis comprises receiving data from one or more of airline operations, maintenance, aircraft in flight, airport operations, airline management, aircraft suppliers, and third party suppliers.

4. The method of claim 1 wherein accessing the data from the plurality of enterprise systems comprises:

identifying the data within the plurality of enterprise systems that is associated with the current situation; and retrieving the identified data.

5. The method of claim 4 wherein identifying the data within the plurality of enterprise systems associated with the current situation comprises identifying one or more of flight crew, cabin crew, mechanics, baggage handlers, gate agents, reservation agents, customer service agents, airline operations staff, maintenance operations staff, station operation staff, aircraft assets, hanger bays, tools, ground equipment, and terminal gates that are associated with the current situation.

6. The method of claim 4 wherein identifying the data within the plurality of enterprise systems is performed in accordance with a defined set of data definitions.

7. The method of claim 1 wherein processing the situational awareness data set includes filtering the situational awareness data set in accordance with the profile so that the information contained within the viewable situational awareness data is the information most relevant to the profile.

8. The method of claim 1 wherein the viewable situational awareness data set includes at least one proposed response to the current situation.

9. The method of claim 8 wherein the at least one proposed response is generated from an application of said business rules and said historical data to said data related to the current situation.

10. The method of claim 1 wherein processing the situational awareness data set comprises:

identifying any trends in the historical data; and creating a presentation for the individual that addresses the trends.

11. The method of claim 1 wherein correlating the data in accordance with one or more business rules comprises:

defining one or more business goals within the business rules; and assessing the received data against the business goals.

12. The method of claim 1 wherein accessing data related to the current situation comprises at least one of capturing the data in a received message and extracting the data from a data stream.

13. The method of claim 1 wherein accessing data related to the current situation comprises at least one of receiving data from at least one airborne system.

14. The method of claim 1 wherein interpreting the correlated data in view of historical data comprises utilizing the historical data to identify trends in the situational awareness data set.

15. The method of claim 1 wherein processing the situational awareness data set in view of a profile comprises filtering the situational awareness data set in accordance with the profile so that the information contained within the viewable situational awareness data set is the information most relevant to the profile.

16. A method of presenting a user specific situational awareness data set to a user networked to a system, wherein the user specific situational awareness data set presented is defined by a profile of a user accessing the system, said method comprising:

retrieving data from a plurality of enterprise systems;

processing the data in accordance with one or more business rules and in view of historical data;

generating a situational awareness data set from the processed data;

filtering the situational awareness data in response to interface presentation parameters defined by the profile of the user;

generating user optimized situational awareness data; and presenting the user optimized situational awareness data through a user interface.

17. The method of claim 16 wherein generating user optimized situational awareness data comprises determining which situational awareness data is most relevant to the profile of the user and a situation the user is to address.

18. The method of claim 16 wherein generating a situational awareness data set from the processed data comprises utilizing the historical data to interpret current situational awareness data.

19. The method of claim 16 wherein processing the data in accordance with one or more business rules and in view of historical data comprises identifying trends in the historical data.

20. The method of claim 15 wherein generating user optimized situational awareness data comprises creating custom views of the situational awareness data according to user profiles.

21. The method of claim 20 wherein creating custom views of the situational awareness data according to user profiles comprises creating at least one global unified view for one or more of resource utilization, flight following, schedule buffer times and at least one local, specific view for one or more of facility, aircraft type, and personnel type.

22. A situational awareness system comprising:

a user interface;

a plurality of enterprise systems;

an integration system networked to said interface and configured to receive situational awareness data from said plurality of enterprise systems;

a decision support system integrated with said integration system and said user interface, said decision support system operatively configured to correlate situational information received from each of said plurality of enterprise systems with information received from said integration system, said decision support system further configured to process the received information applying business rules and historical data, and generate a situational awareness data set for transmission to said interface.

23. The system of claim 22 wherein said decision support system comprises data for operatively configuring the situational awareness data set based on an input to said interface, the input causing said situational awareness system to generate the situational awareness data set utilizing data relevant to the input.

24. The system of claim 22 wherein said integration system is programmed to generate the situational awareness data set in accordance with a profile associated with a user accessing said situational awareness system via said interface.

25. The system of claim 22 wherein said integration system is configured to generate the situational awareness data set based on the data received from said enterprise systems that is related to a current situation as indicated in the data received from one or more of said enterprise systems.

26. The system of claim 25 wherein said integration system is programmed to:

identify that data received from said plurality of enterprise systems associated with a current situation;

retrieve the identified data; and correlate the identified data with one or more of business rules, historical data, and a user profile to generate a relevant situational awareness data set.

27. The system of claim 26, said system configured to generate a relevant situational awareness data set that comprises at least one global unified view for one or more of resource utilization, flight following, schedule buffer times and at least one local, specific view for one or more of facility, aircraft type, and personnel type.

28. The system of claim 22 wherein said plurality of enterprise systems comprises one or more of airline operations systems, aircraft maintenance systems, systems onboard aircraft, airport operations systems, airline management systems, aircraft supplier systems, and third party supplier systems.

29. The system of claim 22 wherein at least one of said decision support system and said integration system is configured to generate, using the situational awareness data set, and output, through said interface, one or suggestions for addressing a situation identified from the situational information received from said enterprise systems.

30. The system of claim 22 wherein the situational awareness data set includes one or more of maintenance fault messaging data, inventory data, ETOPS rules, flight schedules, aircraft documentation, documentation on resources including people equipment and facilities, and maintenance plans.

* * * * *